United States Patent
Zhu et al.

(10) Patent No.: US 11,528,630 B2
(45) Date of Patent: Dec. 13, 2022

(54) METHODS AND APPARATUS TO FACILITATE LAYER 1 USER EQUIPMENT (UE) FILTERING FOR MILLIMETER WAVE FREQUENCIES

(71) Applicant: QUALCOMM Incorporated, San Diego, CA (US)

(72) Inventors: Jun Zhu, San Diego, CA (US); Ling Ding, Chester, NJ (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 16/909,747

(22) Filed: Jun. 23, 2020

(65) Prior Publication Data

US 2020/0413277 A1    Dec. 31, 2020

Related U.S. Application Data

(60) Provisional application No. 62/866,541, filed on Jun. 25, 2019.

(51) Int. Cl.
*H04W 24/10* (2009.01)
*H04B 7/26* (2006.01)
(Continued)

(52) U.S. Cl.
CPC ............ *H04W 24/10* (2013.01); *G01S 5/14* (2013.01); *H04B 7/2668* (2013.01);
(Continued)

(58) Field of Classification Search
CPC .... H04W 24/10; H04W 36/00; H04B 7/2668; H04B 17/309; H04B 17/101; H04B 17/21;
(Continued)

(56) References Cited

U.S. PATENT DOCUMENTS

2004/0076185 A1    4/2004  Kim et al.
2014/0248840 A1*   9/2014  Karri ................. H04W 48/16
                                                       455/67.11
(Continued)

FOREIGN PATENT DOCUMENTS

WO    2018231123 A1    12/2018

OTHER PUBLICATIONS

3GPP TS 38.331: "3rd Generation Partnership Project; Technical Specification Group Radio Access Network; NR; Radio Resource Control (RRC) Protocol Specification (Release 15)", 3GPP Draft_ 38331-F60, Mobile Competence Centre, 650, Route Des Lucioles, F-06921, Sophia-Antipolis Cedex, France, vol. RAN WG2, V15.6.0 (Jun. 22, 2019), XP051751335, pp. 1-517, URL: http://www.3gpp. org/ftp/tsg%5Fran/WG2%5FRL2/Specifications/201906%5Fdraft% 5Fspecs%5Fafter%5FRAN%5F84 [retrieved on Jun. 22, 2019] Section 5.5.3.2, pp. 197,198,384,355,192,193,314,315.

(Continued)

*Primary Examiner* — Chae S Lee
(74) *Attorney, Agent, or Firm* — Procopio, Cory, Hargreaves & Savitch LLP

(57) ABSTRACT

Apparatus, methods, and computer-readable media for facilitating L1 UE-side filtering for mmW frequencies are disclosed herein. An example method for wireless communication at a user equipment includes configuring a filter coefficient for a serving beam. The example method also includes applying the filter coefficient to the serving beam to determine an updated filtered measurement result. The example method also includes reporting the updated filtered measurement result to a base station.

22 Claims, 6 Drawing Sheets

(51) Int. Cl.
  *G01S 5/14* (2006.01)
  *H04L 25/02* (2006.01)
  *H04B 17/309* (2015.01)
  *H04L 1/00* (2006.01)
(52) U.S. Cl.
  CPC ......... *H04B 17/309* (2015.01); *H04L 1/0026* (2013.01); *H04L 25/0222* (2013.01)
(58) Field of Classification Search
  CPC ....... H04B 7/0621; H04B 7/0617; G01S 5/14; H04L 25/0222; H04L 1/0026; H04L 25/0224
  See application file for complete search history.

(56) References Cited

U.S. PATENT DOCUMENTS

| | | | | |
|---|---|---|---|---|
| 2015/0023193 | A1* | 1/2015 | Zhang | H04W 24/10 370/252 |
| 2017/0208494 | A1* | 7/2017 | Moon | H04B 7/0695 |
| 2019/0141557 | A1* | 5/2019 | da Silva | H04W 56/001 |
| 2019/0238210 | A1* | 8/2019 | Tang | H04B 17/309 |
| 2020/0374960 | A1* | 11/2020 | Deenoo | H04W 72/14 |

OTHER PUBLICATIONS

International Search Report and Written Opinion—PCT/US2020/039419—ISA/EPO—dated Oct. 7, 2020.
Samsung: "Filtering for Beam Level Measurement", 3GPP TSG-RAN WG2 2017 RAN2#97bis Meeting, 3GPP Draft; R2-1703714 Filtering for Beam Level Measurement, 3rd Generation Partnership Project (3GPP), Mobile Competence Centre; 650, Route Des Lucioles; F-06921 Sophia-Antipolis Cedex; France, vol. RAN WG2, No. Spokane, USA; Apr. 3, 2017-Apr. 7, 2017, Apr. 3, 2017 (Apr. 3, 2017), 6 Pages, XP051245522, From Internet: URL: http://www.3gpp.org/ftp/Meetings_3GPP_SYNC/RAN2/Docs/ [retrieved on Apr. 3, 2017] Section 1; Section 5.1; Section 5.2; Section 5.3.

* cited by examiner

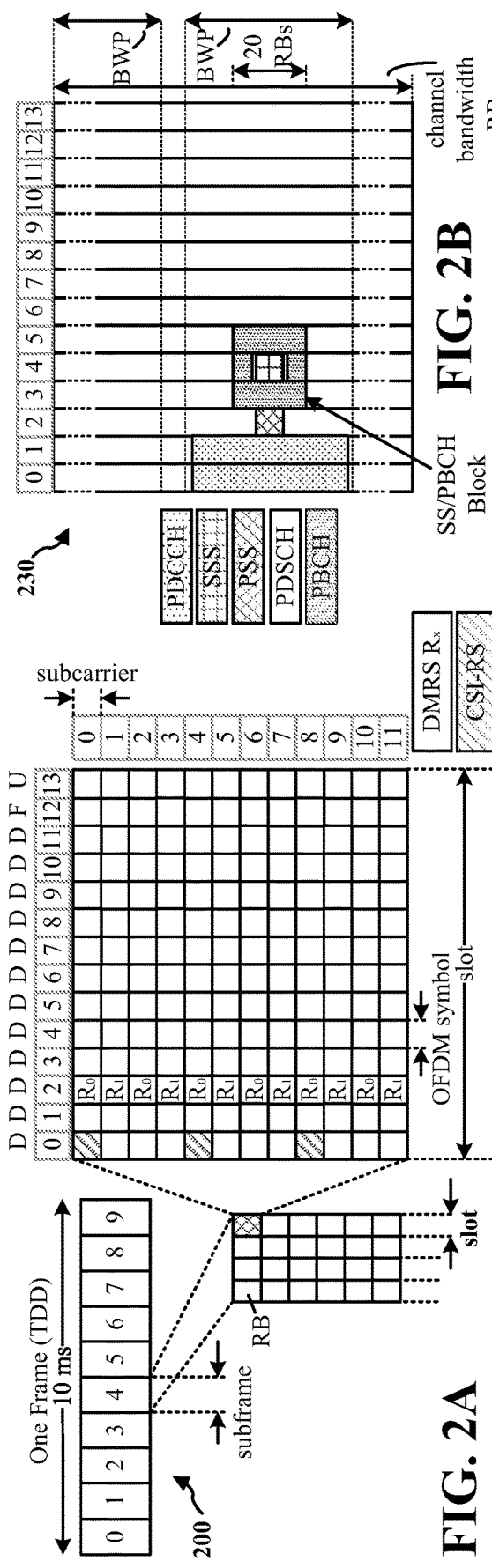
FIG. 2A
FIG. 2B
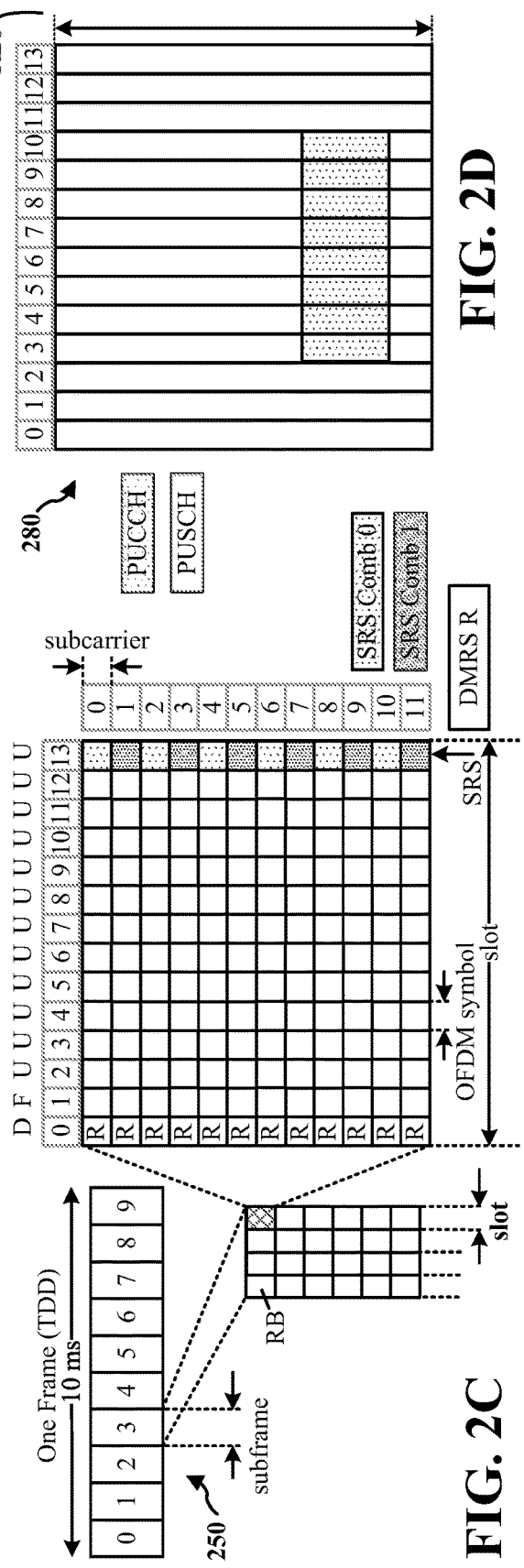
FIG. 2C
FIG. 2D

METHODS AND APPARATUS TO FACILITATE LAYER 1 USER EQUIPMENT (UE) FILTERING FOR MILLIMETER WAVE FREQUENCIES

CROSS REFERENCE TO RELATED APPLICATION(S)

This application claims the benefit of U.S. Patent Provisional Application Ser. No. 62/866,541, entitled "Methods and Apparatus to Facilitate Layer 1 User Equipment (UE) Filtering for Millimeter Wave Frequencies," and filed on Jun. 25, 2019, which is expressly incorporated by reference herein in its entirety.

BACKGROUND

Technical Field

The present disclosure relates generally to communication systems, and more particularly, to beam management for wireless communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Layer 1 (L1) filtering may be useful for determining if (or when) performing a handover may be beneficial based on, for example, a measurement report. In millimeter wave (mmW) communications, a user equipment (UE) may track performance of serving cells and neighboring cells, as well as the performance of beam pairs (e.g., transmit-receive beam pairs). Tracking the performance of beam pairs may be useful for determining when to change to a different beam pair. In some examples, the UE may utilize previous measurements when determining the measurement report. However, it may be appreciated that in some such examples, channel conditions at the time of previous measurements may impact the outcome of the current measurement.

Example techniques disclosed herein facilitate determining a filter coefficient based on one or more filter coefficient-related measurements available to the UE. The filter coefficient may enable the UE to provide some level of filtering so that a current received measurement is provided some weight when determining the measurement result relative to a previous filtered measurement result. For example, if the current received measurement is determined to be relatively reliable, then the filter coefficient may be selected so that the current received measurement is provided relatively more weight than the previous filtered measurement result. In some examples, the UE may determine the filter coefficient based on one or more parameters, such as Doppler estimates, channel quality measurements, rotation estimates, and/or channel type information (e.g., whether there is line-of-sight or no line-of-sight).

In an aspect of the disclosure, a method, a computer-readable medium, and an apparatus for wireless communication at a UE are provided. An example apparatus configures a filter coefficient for a serving beam. The example apparatus also applies the filter coefficient to the serving beam to determine an updated filtered measurement result. The example apparatus also reports the updated filtered measurement result to a base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G NR frame, DL channels within a 5G NR subframe, a second 5G NR frame, and UL channels within a 5G NR subframe, respectively.

DETAILED DESCRIPTION

Figure 1:
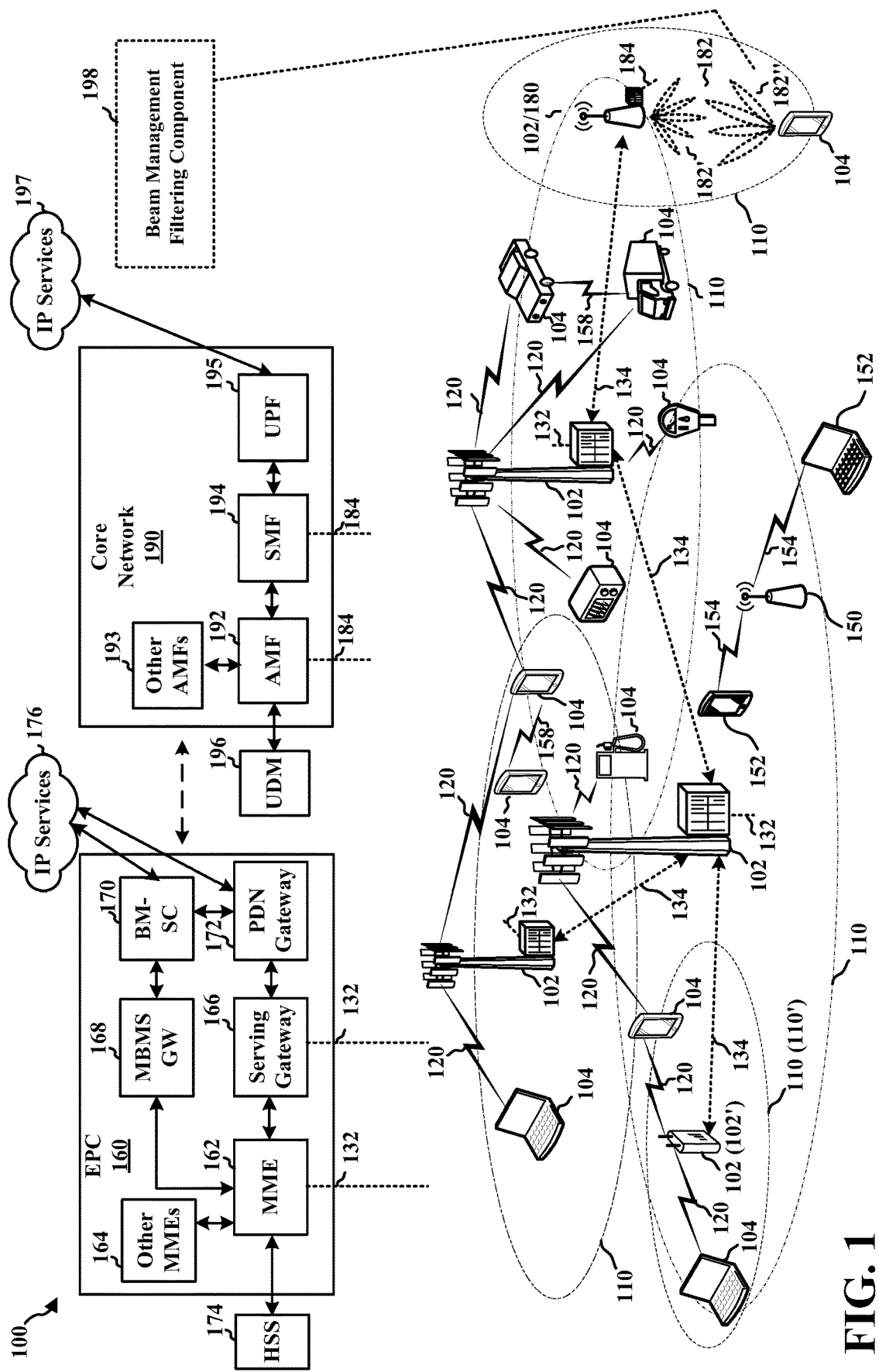
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Layer 1 (L1) filtering may be useful for determining a reliable measurement result, for example, for a beam pair. In some examples, it may be beneficial to provide some level of filtering so that a current received measurement is provided some weight when determining the measurement result relative to a previous filtered measurement result.

Example techniques disclosed herein facilitate determining a filter coefficient based on one or more filter coefficient-related measurements available to a UE. For example, the UE may determine the filter coefficient based on Doppler estimates, channel quality measurements, rotation estimates, and/or channel type information (e.g., whether there is line-of-sight or no line-of-sight).

FIG. 1 is a diagram illustrating an example of a wireless communications system and an access network 100 that includes UEs 104 in communication with base stations 102 or base stations 180. In some examples, the UE 104 may be configured to manage one or more aspects of wireless communication by utilizing beam management filtering. As an example, in FIG. 1, the UE 104 may include a beam management filtering component 198. In certain aspects, the beam management filtering component 198 may be configured to configure a filter coefficient for a serving beam. The example beam management filtering component 198 may also be configured to apply the filter coefficient to the serving beam to determine an updated filtered measurement result. The example beam management filtering component 198 may also be configured to report the updated filtered measurement result to a base station.

Although the following description provides examples directed to 5G NR, the concepts described herein may be applicable to other similar areas, such as LTE, LTE-A, CDMA, GSM, and/or other wireless technologies, in which a UE may perform beam management.

The wireless communications system (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., Si interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)(also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
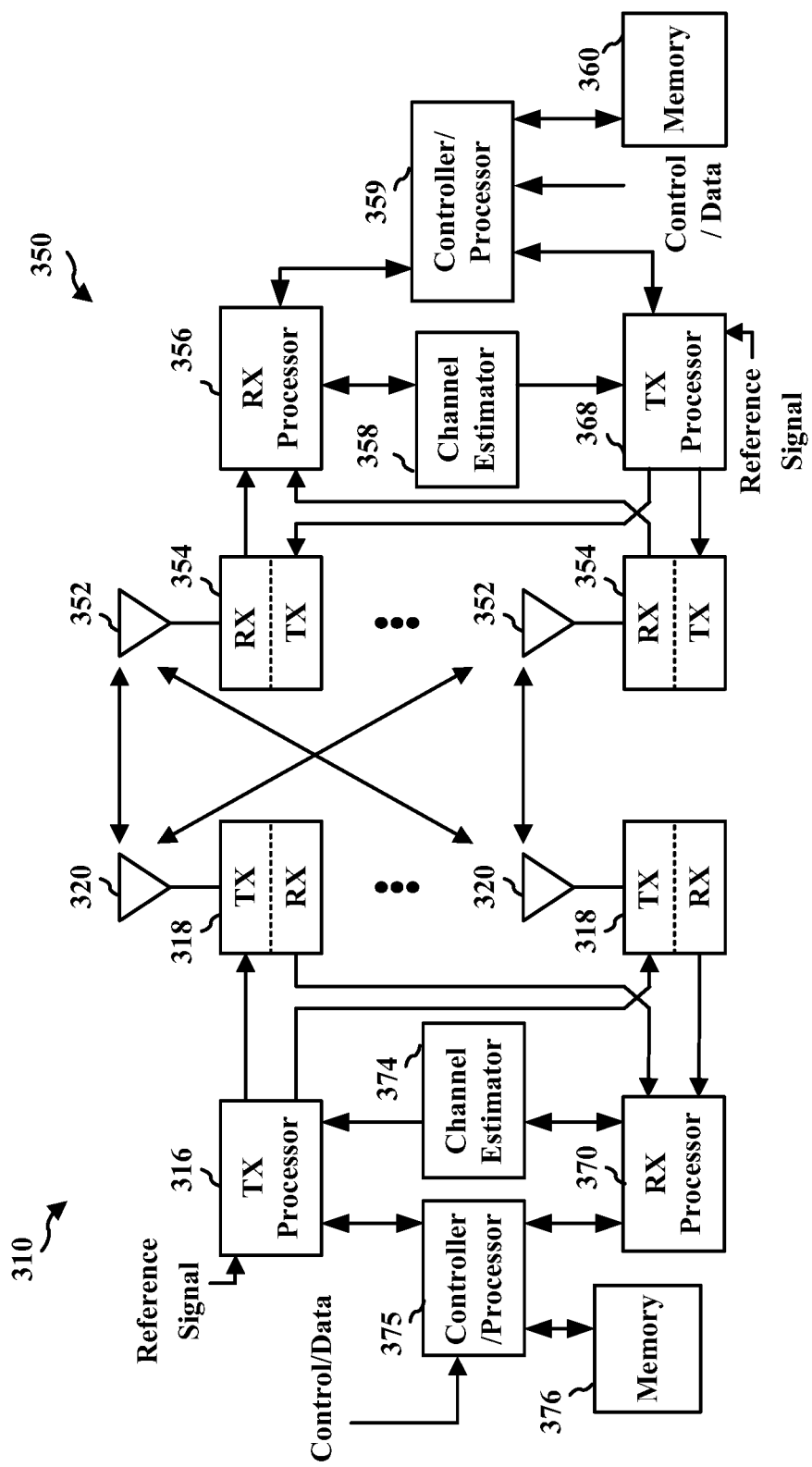
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam management filtering component 198 of FIG. 1.

Example techniques disclosed herein are directed to UE-side layer 1 (L1) filtering for millimeter wave (mmW) communications. L1 filtering may be useful for determining if (or when) a handover may be beneficial based on, for example, a measurement report. In mmW communications, a UE may track performance of serving cells and neighboring cells, as well as the performance of beam pairs (e.g., Tx-Rx beam pairs). Tracking the performance of beam pairs may be useful for determining when to change to a different beam pair.

Example techniques disclosed herein facilitate providing robust and reliable measurements. For example, disclosed techniques utilize a filter, such as an infinite impulse response (IR) filter, at a UE to determine an updated filtered measurement based on a previous filtered measurement, a latest measurement value, and a filter coefficient α. For example, an IIR filter may enable the UE to determine the updated filtered measurement using a relatively low feedback filter order, and, thus, increasing computational savings at the UE. In some examples, a UE may utilize Equation 1 (below) to perform L1 (beam-level) filtering.

$$y(t)=(1-\alpha)y(t-1)+\alpha x(t), 0\leq\alpha\leq1 \quad \text{(Equation 1)}$$

In Equation 1, the term "y(t)" represents an updated filtered measurement value, the term "y(t−1)" represents a previous filtered measurement result, the term "x(t)" represents a current received measurement from the physical layer, and the terms "α" and "(1−α)" represent filter coefficients. In Equation 1, the filter coefficient α corresponds to a first weight bounded between zero and one that is applied to the current received measurement x(t), and the filter coefficient (1−α) corresponds to a second weight, also bounded between zero and one, that is applied to the previous filtered measurement result y(t−1). As the updated filtered measurement value y(t) is based on the current received measurement x(t) and the previous filtered measurement result y(t−1), it may be appreciated that Equation 1 may function similar to a running average (or moving average) with a variable bias between, for example, the current received measurement x(t) and the previous filtered measurement result y(t−1).

Based on Equation 1 (above), it may be appreciated that as the value of the filter coefficient α increases, the updated filtered measurement value y(t) relies relatively more on the current received measurement x(t) and relies relatively less on the previous filtered measurement result y(t−1). For example, if the filter coefficient α is set to one, then the updated filtered measurement value y(t) is based on the current received measurement x(t). Furthermore, as the value of the filter coefficient α decreases, the updated filtered measurement value y(t) relies less on the current received measurement x(t) and relies relatively more on the previous filtered measurement result y(t−1). For example, if the filter coefficient α is set to zero, then the updated filtered measurement value y(t) is based on the previous filtered measurement result y(t−1).

Thus, it may be appreciated that selecting the filter coefficient α enables a trade-off between the current received measurement x(t) and the previous filtered measurement result y(t−1). Example techniques disclosed herein facilitate configuring the filter coefficient α based on one or more parameters, such as a Doppler measurement, a channel quality (e.g., signal-to-noise ratio (SNR)), UE rotation, and/or based on line-of-sight. For example, if the current received measurement x(t) is determined to be relatively reliable, then the filter coefficient α may be selected so that the current received measurement x(t) is provided relatively more weight than the previous filtered measurement result y(t−1).

For example, a Doppler measurement may represent a moving speed of the UE relative to a base station. In some examples, if a Doppler estimate is available, the UE may determine (or adjust) the value of the filter coefficient α relative to the Doppler estimate. For example, the filter coefficient α may be configured as a decreasing function of the Doppler estimate. For example, as the Doppler measurement increases, a relatively deeper filter may be useful to average out small scale fading. That is, if there is a relatively high moving speed (e.g., a high Doppler estimate), then the relative reliability of the current received measurement x(t) may be decreased and the filter coefficient α may be decreased so that less weight is provided to the current received measurement x(t) relative to the previous filtered measurement result y(t−1).

In some examples, the filter coefficient α may vary (or be adjusted) based on channel quality (e.g., SNR). For example, when a channel quality measurement is available, the UE may configure the filter coefficient α as an increasing function of SNR. For example, as the measured SNR decreases, a relatively deeper filter may be useful to average out noise and/or measurement error. In some such examples, as the measured SNR decreases, the UE may decrease the filter coefficient α so that less weight is provided to the current received measurement x(t) relative to the previous filtered measurement result y(t−1).

In some examples, the filter coefficient α may vary (or be adjusted) based on rotation speed (e.g., if a rotation estimate is available). For example, the filter coefficient α may operate as an increasing function of rotation speed. In some such examples, the faster the UE rotates, applying a smaller filter may be beneficial to prevent overly aggressive changes to the filtered measurement.

In some examples, channel type information may include a line-of-sight measurement that indicates whether the UE has a line-of-sight (LOS) or no line-of-sight (NLOS). For example, the filter coefficient α may vary based on whether there is LOS or NLOS (e.g., if channel type information is available). In some such examples, the UE may adjust the filter coefficient α to be relatively small in a LOS scenario. The UE may adjust the filter coefficient α to be relatively high in a NLOS scenario.

In some examples, it may be beneficial to regularly track a beam pair (e.g., a serving Tx-Rx beam pair). For example, the UE may track, with a certain periodicity (e.g., with an 80 ms interval), a serving Tx-Rx beam pair for PDSCH. By utilizing the example above-mentioned criteria for configuring the filter coefficient α, the UE may select a filter coefficient $\alpha_S$ for the serving Tx-Rx beam pair.

In some examples, the filter coefficient as configured for the serving beam may then be used to determine the filter coefficient α for other Tx-Rx beam pairs. It may be appreciated that the sampling interval for a respective Tx-Rx beam pair may be different than the sampling interval for the serving beam. In some such examples, example techniques disclosed herein may determine the filter coefficient α for other Tx-Rx beam pairs based on their respective sampling intervals relative to the sampling interval of the serving beam.

As an illustrative example, a filter coefficient α for an L1 filter with a sampling interval of X ms may be configured so that a time constant is the same as the L1 filter with a sampling interval of 80 ms (e.g., for the serving beam) and for the filter coefficient $\alpha_S$. For example, the UE may use Equation 2 (below) to apply the filter coefficient $\alpha_S$ for the serving beam to another Tx-Rx beam.

$$\alpha_N = 1-(1-\alpha_S)^{X_N/X_S} \quad \text{(Equation 2)}$$

In Equation 2 (above), the term "$\alpha_N$" represents the filter coefficient α for the Nth Tx-Rx beam, the term "$\alpha_S$" represents the filter coefficient α for the serving beam, and the term "$X_N$" represents a sampling interval for the Nth Tx-Rx beam. Furthermore, in Equation 2, the term "$X_S$" represents a sampling interval for the serving beam. In the above example, it may be appreciated that the sampling interval for the serving beam $X_S$ is 80 ms. However, in additional or alternative examples, any reasonable sampling interval for the serving beam $X_S$ may be used.

It may be appreciated that based on Equation 1 (above), the value of the filter coefficient α is between zero and one. However, in some examples, the value of the filter coefficient α may be bounded between zero and one. For example, the filter coefficient α may be bounded between 0.5 and 0.95 (e.g., 0.5≤α≤0.95). It may be useful to bind the filter coefficient α to values between 0.5 and 0.95 so that some weight is applied to the previous filtered measurement result y(t−1) and to the current received measurement x(t). For example, in some instances, the UE may not be able to determine whether the UE is in a rotation scenario, a Doppler scenario, or a rotation and Doppler combination scenario, and/or whether the UE is in a LOS scenario or a NLOS scenario. Furthermore, in some examples, even if such information is available to the UE, the scenario(s) may change with time. Accordingly, it may be beneficial for the UE to avoid relatively deep filtering, which may have negative effect(s) in some scenarios (e.g., based on rotation scenarios or LOS scenarios).

Although the above example provides a lower bound of 0.5 and an upper bound of 0.95 for the filter coefficient α, in other examples, the lower bound and/or the upper bound for configuring the filter coefficient α may be suitably adjusted. For example, the lower bound may be a value greater than zero and the upper bound may be a value less than 1. In some such examples, the values of the lower bound and the upper bound for the filter coefficient α may be selected to enable a gradual change between using current received measurements x(t) and previous filtered measurement results y(t−1) when determining the updated filtered measurement result y(t).

In some examples, noise may exist. For example, noise may include thermal noise, measurement errors, etc. In some such examples, it may be beneficial for the UE to apply some filtering to limit the effects of the noise, even if the UE is in a rotation scenario or an LOS scenario. Thus, it may be beneficial to avoid no filtering. For example, the filter coefficient α may be set to zero so that the updated filtered measurement result y(t) is based on the previous filtered measurement result y(t) and not the current received measurement x(t).

Figure 4:
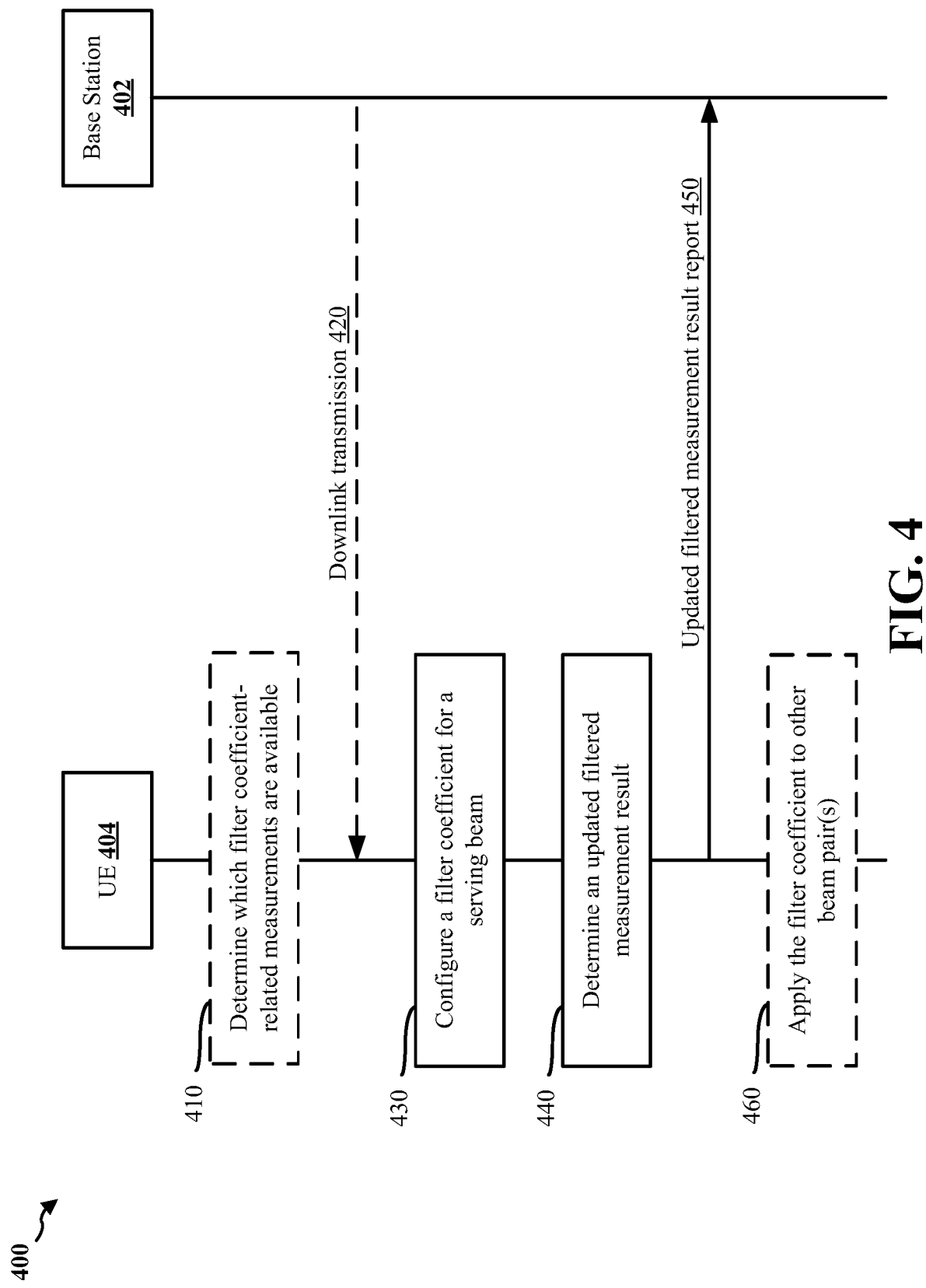
FIG. 4 is an example communication flow between a base station and a UE, in accordance with one or more aspects of this disclosure.

FIG. 4 illustrates an example communication flow 400 between a base station 402 and a UE 404, in accordance with one or more techniques disclosed herein. Aspects of the base station 402 may be implemented by the base station 102, the base station 180, and/or the base station 310. Aspects of the UE 404 may be implemented by the UE 104 and/or the UE 350. Although not shown in the illustrated example of FIG. 4, it may be appreciated that in additional or alternative examples, the base station 402 may be in communication with one or more other base stations or UEs, and/or the UE 404 may be in communication with one or more other base stations or UEs.

At 410, the UE 404 may determine which filter coefficient-related measurements are available to the UE 404. For example, the UE 404 may determine whether a Doppler estimate is available, whether a channel quality measurement (e.g., SNR) is available, whether a rotation estimate is available, whether channel type information (e.g., an LOS scenario or an NLOS scenario) is available, and/or whether beam sampling rate information is available.

In some examples, the filter coefficient-related measurements may be provided to the UE 404. For example, the base station 402 may transmit a downlink transmission 420 that is received by the UE 404. The downlink transmission 420 may be RRC signaling, DCI, a medium access control-control element (MAC-CE), and/or a downlink reference signal. In some examples, the UE 404 may determine the available filter coefficient-related measurements based on information included in the downlink transmission 420. In some example, the UE 404 may perform one or more measurements based on the downlink transmission 420 to determine which filter coefficient-related measurements are available.

At 430, the UE 404 configures a filter coefficient for a serving beam. In some examples, the serving beam may be a beam pair used to receive the downlink transmission 420. In some examples, the UE 404 may configure a filter coefficient α based on the filter coefficient-related measurements available to the UE 404 (e.g., at 410). For example, the UE 404 may configure the filter coefficient α by decreasing the filter coefficient α relative to a Doppler estimate. In some examples, the UE 404 may configure the filter coefficient α by increasing the filter coefficient α relative to a channel quality measurement. In some examples, the UE 404 may configure the filter coefficient α by increasing the filter coefficient α relative to a rotation estimate. In some examples, the UE 404 may configure the filter coefficient α by adjusting the filter coefficient α based on a line-of-sight measurement. In some examples, the UE 404 may configure the filter coefficient α by adjusting the filter coefficient α based on a beam sampling rate.

At 440, the UE 404 determines an updated filtered measurement result by applying the filter coefficient to the serving beam. For example, the UE 404 may apply the filter coefficient $α_S$ to the serving beam to determine an updated filtered measurement value y(t). In some examples, the UE 404 may apply Equation 1 (reproduced below) to determine the updated filtered measurement value y(t).

$$y(t)=(1-α)y(t-1)+αx(t), 0 \leq α \leq 1 \quad \text{(Equation 1)}$$

In the illustrated example of FIG. 4, the UE 404 reports the updated filtered measurement value y(t) to the base station 402. For example, the UE 404 transmits an updated filtered measurement result report 450 that is received by the base station 402. The updated filtered measurement result report 450 may include the updated filtered measurement value y(t).

At 460, the UE 404 may apply the filter coefficient configured for the serving beam (e.g., the filter coefficient $α_S$) to other beam pair(s). For example, the UE 404 may apply Equation 2 (reproduced below) to determine the filter coefficient α for respective beam pair(s) (e.g., Tx-Rx beam pairs) based on their respective sampling intervals $X_N$ and the filter coefficient $α_S$ for the serving beam.

$$α_N = 1-(1-α_S)^{X_N/X_S} \quad \text{(Equation 2)}$$

Figure 5:
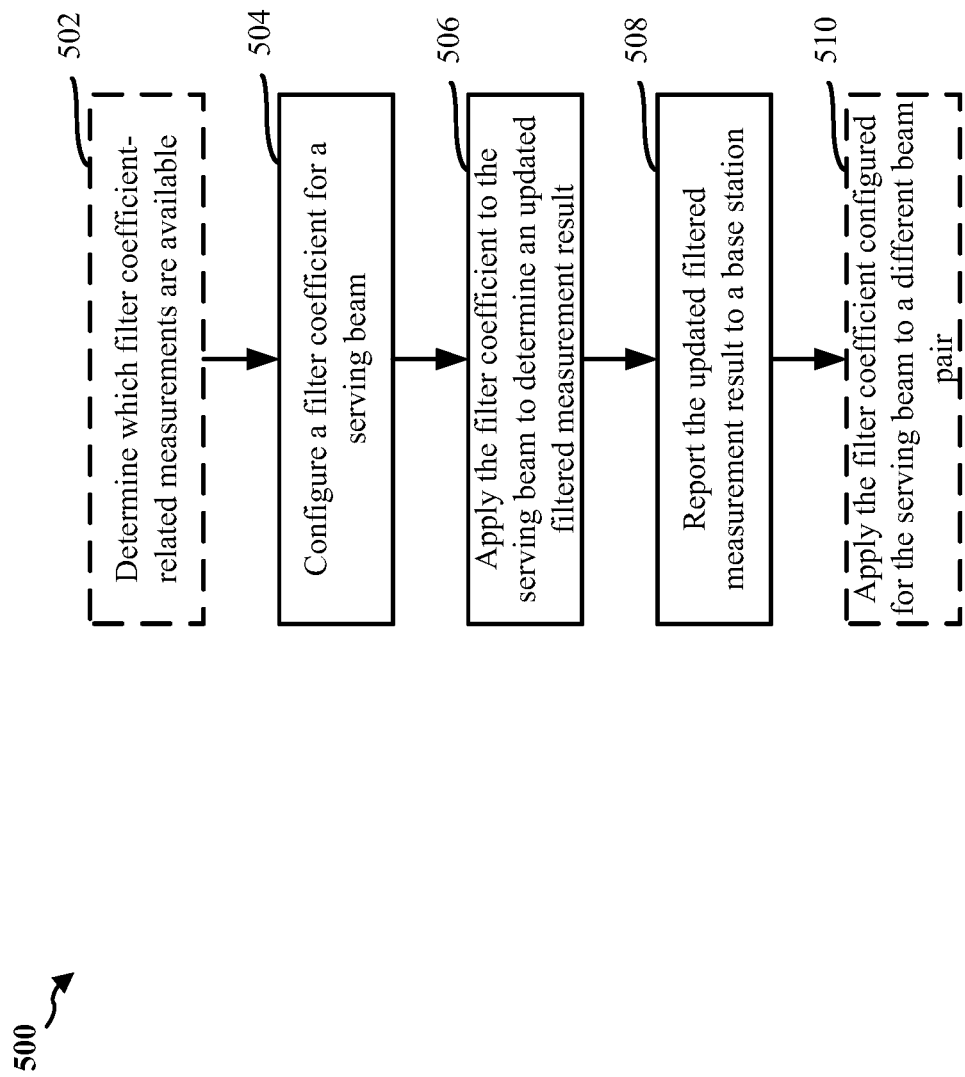
FIG. 5 is a flowchart of a method of wireless communication at a UE, in accordance with one or more aspects of this disclosure.

FIG. 5 is a flowchart 500 of a method of wireless communication. The method may be performed by a UE or a component of a UE (e.g., the UE 104, the UE 350, and/or the UE 504; the apparatus 602, a processing system, which may include the memory 360 and which may be the entire UE 350 or a component of the UE 350, such as the TX processor 368, the RX processor 356, and/or the controller/processor 359). Optional aspects are illustrated with a dashed line. The method may enable a UE to perform a reliable and/or robust evaluation of beam-level measurements and to facilitate reducing signaling overhead.

At 502, the UE may determine which filter coefficient-related measurements are available, as described above in connection with 410 of FIG. 4. For example, the determining of which filter coefficient-related measurements are available may be performed by a filter coefficient-related measurements component 640 of the apparatus 602 of FIG. 6. In some examples, the filter coefficient-related measurements may be based on at least one of a Doppler estimate, a channel quality measurement, a rotation estimation, and channel type information.

At 504, the UE configures a filter coefficient for a serving beam, as described above in connection with 430 of FIG. 4. For example, the configuring of the filter coefficient may be performed by a filter coefficient configuring component 642 of the apparatus 602. In some examples, configuring the filter coefficient may comprise decreasing the filter coefficient relative to a Doppler estimate. In some examples, configuring the filter coefficient may comprise increasing the filter coefficient relative to a channel quality measurement. In some examples, configuring the filter coefficient may comprise increasing the filter coefficient relative to a rotation estimate. In some examples, configuring the filter coefficient may comprise adjusting the filter coefficient based on a line-of-sight measurement. In some examples, configuring the filter coefficient may comprise adjusting the filter coefficient based on a beam sampling rate.

At 506, the UE applies the filter coefficient to the serving beam to determine an updated filtered measurement result, as described above in connection with 440 of FIG. 4. For example, the applying of the filter coefficient may be performed by a filter coefficient applying component 644 of the apparatus 602. In some examples, the updated filtered measurement result may be based on the filter coefficient, a current received measurement, and a previous filtered measurement result. In some examples, the filter coefficient may include a first weight α to apply to the current received measurement and may include a second weight (1−α) to apply to the previous filtered measurement result. In some such examples, a sum of the first weight and the second weight may be one. In some examples, the first weight may be a value between zero and one. In some examples, the first weight may be a value between 0.5 and 0.95.

At 508, the UE reports the updated filtered measurement result to a base station, as described above in connection with the updated filtered measurement result report 450 of FIG. 4. For example, the reporting of the updated filtered measurement result may be performed by a transmission component 634 and/or an updated filtered measurement result reporting component 646 of the apparatus 602.

At 510, the UE may apply the filter coefficient configured for the serving beam to a different beam pair, as described above in connection with 460 of FIG. 4. For example, the applying of the filter coefficient may be performed by the filter coefficient applying component 644 of the apparatus 602.

Figure 6:
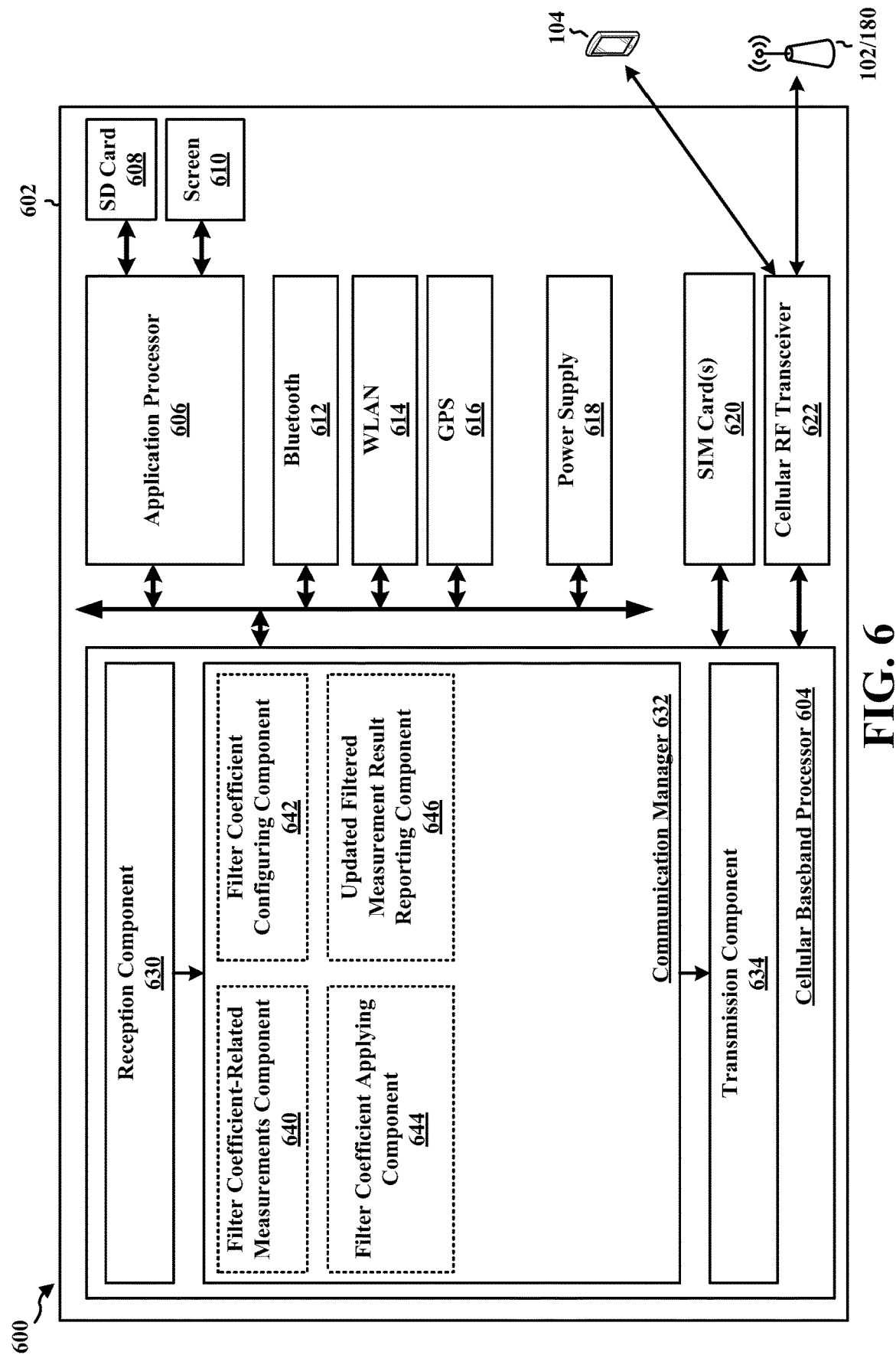
FIG. 6 is a diagram illustrating an example of a hardware implementation for an example apparatus, in accordance with one or more aspects of this disclosure.

FIG. 6 is a diagram 600 illustrating an example of a hardware implementation for an apparatus 602. The apparatus 602 is a UE and includes a cellular baseband processor 604 (also referred to as a modem) coupled to a cellular RF transceiver 622 and one or more subscriber identity modules (SIM) cards 620, an application processor 606 coupled to a secure digital (SD) card 608 and a screen 610, a Bluetooth module 612, a wireless local area network (WLAN) module 614, a Global Positioning System (GPS) module 616, and a power supply 618. The cellular baseband processor 604 communicates through the cellular RF transceiver 622 with the UE 104 and/or BS 102/180. The cellular baseband processor 604 may include a computer-readable medium/memory. The cellular baseband processor 604 is responsible for general processing, including the execution of software stored on the computer-readable medium/memory. The software, when executed by the cellular baseband processor 604, causes the cellular baseband processor 604 to perform the various functions described supra. The computer-readable medium/memory may also be used for storing data that is manipulated by the cellular baseband processor 604 when executing software. The cellular baseband processor 604 further includes a reception component 630, a communication manager 632, and a transmission component 634. The communication manager 632 includes the one or more illustrated components. The components within the communication manager 632 may be stored in the computer-readable medium/memory and/or configured as hardware within the cellular baseband processor 604. The cellular baseband processor 604 may be a component of the UE 350 and may include the memory 360 and/or at least one of the TX processor 368, the RX processor 356, and the controller/processor 359. In one configuration, the apparatus 602 may be a modem chip and include just the baseband processor 604, and in another configuration, the apparatus 602 may be the entire UE (e.g., see the UE 350 of FIG. 3) and include the afore discussed additional modules of the apparatus 602.

The communication manager 632 includes a filter coefficient-related measurements component 640, a filter coefficient configuring component 642, a filter coefficient applying component 644, and an updated filtered measurement result reporting component 646 that may be configured to perform the aspects described in connection with FIG. 5.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 602, and in particular the cellular baseband processor 604, includes means for configuring a filter coefficient for a serving beam. The example apparatus 602 may also include means for applying the filter coefficient to the serving beam to determine an updated filtered measurement result. The example apparatus 602 may also include means for reporting the updated filtered measurement result to a base station. The example apparatus 602 may also include means for decreasing the filter coefficient relative to the Doppler estimate. The example apparatus 602 may also include means for increasing the filter coefficient relative to the channel quality measurement. The example apparatus 602 may also include means for increasing the filter coefficient relative to the rotation estimate. The example apparatus 602 may also include means for adjusting the filter coefficient based on a line-of-sight measurement. The example apparatus 602 may also include means for adjusting the filter coefficient based on a beam sampling rate. The example apparatus 602 may also include means for applying the filter coefficient configured for the serving beam to a different beam pair.

The aforementioned means may be one or more of the aforementioned components of the apparatus 602 configured to perform the functions recited by the aforementioned means. As described supra, the apparatus 602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It may be appreciated from the above that example techniques disclosed herein may facilitate providing reliable and/or robust evaluations of beam-level measurements for UE-side beam management. In some examples, the disclosed techniques may additionally or alternatively assist in improving base station-side beam management based on, for example, the beam-level measurements performed by the UE. It may be appreciated that in some examples, the example techniques disclosed herein may facilitate reducing signaling overhead by, for example, reducing serving-beam ping-pong that may be caused by Doppler effects, noise (e.g., thermal noise), measurement errors, etc.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a User Equipment (UE), comprising: configuring a filter coefficient for a serving beam; applying the filter coefficient to the serving beam to determine an updated filtered measurement result; and reporting the updated filtered measurement result to a base station.

In Example 2, the method of Example 1 further includes that the configuring of the filter coefficient for the serving beam is based on a filter coefficient-related measurement at the UE including at least one of a Doppler estimate, a channel quality measurement, a rotation estimate, and channel type information.

In Example 3, the method of any of Example 1 or Example 2 further includes that the filter coefficient is configured to decrease relative to the Doppler estimate.

In Example 4, the method of any of Examples 1 to 3 further includes that the filter coefficient is configured to increase relative to the channel quality measurement.

In Example 5, the method of any of Examples 1 to 4 further includes that the filter coefficient is configured to increase relative to the rotation estimate.

In Example 6, the method of any of Examples 1 to 5 further includes that the filter coefficient is adjusted based on a line-of-sight measurement.

In Example 7, the method of any of Examples 1 to 6 further includes that the filter coefficient is adjusted based on a beam sampling rate.

In Example 8, the method of any of Examples 1 to 7 further includes that the updated filtered measurement result is based on the filter coefficient, a current received measurement, and a previous filtered measurement result.

In Example 9, the method of any of Examples 1 to 8 further includes that the filter coefficient includes a first weight to apply to the current received measurement and includes a second weight to apply to the previous filtered measurement result, wherein a sum of the first weight and the second weight is one.

In Example 10, the method of any of Examples 1 to 9 further includes that the first weight is between zero and one.

In Example 11, the method of any of Examples 1 to 10 further includes that the first weight is between 0.5 and 0.95.

In Example 12, the method of any of Examples 1 to 11 further includes: applying the filter coefficient configured for the serving beam to a different beam pair.

Example 13 is a device including one or more processors and one or more memories in electronic communication with the one or more processors storing instructions executable by the one or more processors to cause a system or an apparatus to implement a method as in any of Examples 1 to 12.

Example 14 is a system or apparatus including means for implementing a method or realizing an apparatus as in any of Examples 1 to 12.

Example 15 is a non-transitory computer-readable medium storing instructions executable by one or more processors to cause the one or more processors to implement a method as in any of Examples 1 to 12.

What is claimed is:

1. A method of wireless communication for a user equipment (UE), comprising:
configuring a first filter coefficient for a serving beam;
applying the first filter coefficient to the serving beam to determine an updated filtered measurement result, the updated filtered measurement result being based on the first filter coefficient, a current received measurement, and a previous filtered measurement result, the first filter coefficient including a first weight to apply to the current received measurement and a second weight to apply to the previous filtered measurement result, a sum of the first weight and the second weight being one, and the first weight having a maximum value less than one;
reporting the updated filtered measurement result to a base station; and
applying a second filter coefficient to a different beam pair, the second filter coefficient based in part on the first filter coefficient, a first sampling interval for the serving beam, and a second sampling interval for the different beam pair.

2. The method of claim 1, wherein configuring the first filter coefficient for the serving beam is based on a filter coefficient-related measurement at the UE including at least one of a Doppler estimate, a channel quality measurement, a rotation estimate, and channel type information.

3. The method of claim 2, further comprising: decreasing the first filter coefficient relative to the Doppler estimate.

4. The method of claim 2, further comprising: increasing the first filter coefficient relative to the channel quality measurement.

5. The method of claim 2, further comprising: increasing the first filter coefficient relative to the rotation estimate.

6. The method of claim 2, further comprising: adjusting the first filter coefficient based on a line-of-sight measurement.

7. The method of claim 2, further comprising: adjusting the first filter coefficient based on a beam sampling rate.

8. The method of claim 1, wherein the first weight is between 0.5 and 0.95.

9. An apparatus for wireless communication at a user equipment (UE), comprising:
a memory; and
at least one processor coupled to the memory and configured to:
configure a first filter coefficient for a serving beam;
apply the first filter coefficient to the serving beam to determine an updated filtered measurement result, the updated filtered measurement result being based on the first filter coefficient, a current received measurement, and a previous filtered measurement result, the first filter coefficient including a first weight to apply to the current received measurement and a second weight to apply to the previous filtered measurement result, a sum of the first weight and the second weight being one, and the first weight having a maximum value less than one;
report the updated filtered measurement result to a base station; and
apply a second filter coefficient to a different beam pair, the second filter coefficient based in part on the first filter coefficient, a first sampling interval for the serving beam, and a second sampling interval for the different beam pair.

10. The apparatus of claim 9, wherein the at least one processor is configured to configure the first filter coefficient for the serving beam based on a filter coefficient-related measurement at the UE including at least one of a Doppler estimate, a channel quality measurement, a rotation estimate, and channel type information.

11. The apparatus of claim 10, wherein the at least one processor is configured to decrease the first filter coefficient relative to the Doppler estimate.

12. The apparatus of claim 10, wherein the at least one processor is configured to increase the first filter coefficient relative to the channel quality measurement.

13. The apparatus of claim 10, wherein the at least one processor is configured to increase the first filter coefficient relative to the rotation estimate.

14. The apparatus of claim 10, wherein the at least one processor is configured to adjust the first filter coefficient based on a line-of-sight measurement.

15. The apparatus of claim 10, wherein the at least one processor is configured to adjust the first filter coefficient based on a beam sampling rate.

16. An apparatus for wireless communication at a user equipment (UE), comprising:
  means for configuring a first filter coefficient for a serving beam;
  means for applying the first filter coefficient to the serving beam to determine an updated filtered measurement result, the updated filtered measurement result being based on the first filter coefficient, a current received measurement, and a previous filtered measurement result, the first filter coefficient including a first weight to apply to the current received measurement and a second weight to apply to the previous filtered measurement result, a sum of the first weight and the second weight being one, and the first weight having a maximum value less than one;
  means for reporting the updated filtered measurement result to a base station; and
  means for applying a second filter coefficient to a different beam pair, the second filter coefficient based in part on the first filter coefficient, a first sampling interval for the serving beam, and a second sampling interval for the different beam pair.

17. The apparatus of claim 16, wherein the means for configuring the first filter coefficient for the serving beam is based on a filter coefficient-related measurement at the UE including at least one of a Doppler estimate, a channel quality measurement, a rotation estimate, and channel type information.

18. The apparatus of claim 17, wherein the means for configuring the first filter coefficient comprises decreasing the first filter coefficient relative to the Doppler estimate.

19. The apparatus of claim 17, wherein the means for configuring the first filter coefficient comprises increasing the first filter coefficient relative to the channel quality measurement.

20. The apparatus of claim 17, wherein the means for configuring the first filter coefficient comprises increasing the first filter coefficient relative to the rotation estimate.

21. The apparatus of claim 17, wherein the means for configuring the first filter coefficient comprises adjusting the first filter coefficient based on a line-of-sight measurement.

22. The apparatus of claim 17, wherein the means for configuring the first filter coefficient comprises adjusting the first filter coefficient based on a beam sampling rate.

\* \* \* \* \*